US011590576B2

United States Patent
Sakthivel et al.

(10) Patent No.: US 11,590,576 B2
(45) Date of Patent: Feb. 28, 2023

(54) METHOD OF FORMING A HIGH TEMPERATURE SENSOR

(71) Applicants: Navin Sakthivel, Spring, TX (US); Aaron Avagliano, Tomball, TX (US); Farhat Shaikh, Houston, TX (US); Wei Chen, Sugar Land, TX (US); Dan Lu, Minden, NV (US)

(72) Inventors: Navin Sakthivel, Spring, TX (US); Aaron Avagliano, Tomball, TX (US); Farhat Shaikh, Houston, TX (US); Wei Chen, Sugar Land, TX (US); Dan Lu, Minden, NV (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/356,622

(22) Filed: Jun. 24, 2021

(65) Prior Publication Data
US 2022/0410267 A1  Dec. 29, 2022

(51) Int. Cl.
*B22F 10/00* (2021.01)
*B33Y 10/00* (2015.01)
(Continued)

(52) U.S. Cl.
CPC .............. *B22F 10/00* (2021.01); *B22F 7/062* (2013.01); *B33Y 10/00* (2014.12); *B33Y 80/00* (2014.12);
(Continued)

(58) Field of Classification Search
CPC ...... B22F 10/00; B22F 7/062; B22F 2301/15; B22F 2301/20; B33Y 10/00; B33Y 80/00; E21B 47/017; G01D 11/30
See application file for complete search history.

(56) References Cited

U.S. PATENT DOCUMENTS 4,139,833 A * 2/1979 Kirsch ................... H01C 7/006
427/124
5,539,611 A * 7/1996 Hegner ................. C04B 37/026
361/283.4
(Continued)

FOREIGN PATENT DOCUMENTS

JP  2016152395 A  8/2016

OTHER PUBLICATIONS

Jing et al. "Freestanding Functional Structures by Aerosol-Jet Printing for Stretchable Electronics and Sensing Applications." Advanced Materials Technologies 4.7 (2019): 1900048. (Year: 2019).*
(Continued)

*Primary Examiner* — Anthony J Zimmer
*Assistant Examiner* — Ricardo D Morales
(74) *Attorney, Agent, or Firm* — Cantor Colburn LLP

(57) ABSTRACT

A method of forming a high temperature sensor includes preparing a substrate having a surface from an electrically insulative material having a first coefficient of thermal expansion (CTE), preparing an electrical conductor from a metal material having a second CTE that is different from the first CTE, and creating an interface between the electrical conductor and the substrate with a CTE blending medium that is provided between the substrate and the electrical conductor. The CTE blending medium accommodates differing thermal expansion rates of the substrate and the electrical conductor at temperatures of at least 700° C.

21 Claims, 3 Drawing Sheets

(51) Int. Cl.
*B33Y 80/00* (2015.01)
*G01D 11/30* (2006.01)
*E21B 47/017* (2012.01)
*B22F 7/06* (2006.01)

(52) U.S. Cl.
CPC ............ *E21B 47/017* (2020.05); *G01D 11/30* (2013.01); *B22F 2301/15* (2013.01); *B22F 2301/20* (2013.01)

(56) References Cited

U.S. PATENT DOCUMENTS

| | | | |
|---|---|---|---|
| 5,931,000 A * | 8/1999 | Turner | F25B 21/02 |
| | | | 62/3.2 |
| 7,564,008 B2 * | 7/2009 | Mori | C04B 35/645 |
| | | | 118/724 |
| 9,714,869 B2 | 7/2017 | Satou et al. | |
| 9,829,391 B2 | 11/2017 | Sohn et al. | |
| 2012/0086542 A1 | 4/2012 | Bratkovski et al. | |
| 2013/0020670 A1 | 1/2013 | Hori et al. | |
| 2018/0072630 A1 * | 3/2018 | Beaman | C04B 35/64 |

OTHER PUBLICATIONS

International Search Report and Written Opinion for International Application No. PCT/US2022/073023; International Filing Date Jun. 17, 2022; Report dated Oct. 4, 2022 (pp. 1-11).

* cited by examiner

METHOD OF FORMING A HIGH TEMPERATURE SENSOR

BACKGROUND

In the resource recovery industry sensors are employed in a wide variety of applications. Sensors may be used to detect formation parameters, formation fluid parameters, flow and the like. Sensors are also employed to detect a position of various downhole tools. Such sensors often take the form of a proximity sensor that detects when, for example, a piston or a sleeve moves to a selected position. Downhole tools are often subjected to temperatures that may approach or exceed 1000° C.

Current proximity sensors are not robust enough to withstand downhole temperatures that may approach and/or exceed 700° C. for sustained periods. Differing coefficients of thermal expansion between a base and a conductor results in delamination after a short service life. Accordingly, the industry would welcome a sensor that is built to withstand higher downhole temperatures for prolonged periods.

SUMMARY

Disclosed is a method of forming a high temperature sensor including preparing a substrate having a surface from an electrically insulative material having a first coefficient of thermal expansion (CTE), preparing an electrical conductor from a metal material having a second CTE that is different from the first CTE, and creating an interface between the electrical conductor and the substrate with a CTE blending medium that is provided between the substrate and the electrical conductor. The CTE blending medium accommodating differing thermal expansion rates of the substrate and the electrical conductor at temperatures of at least 700° C.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
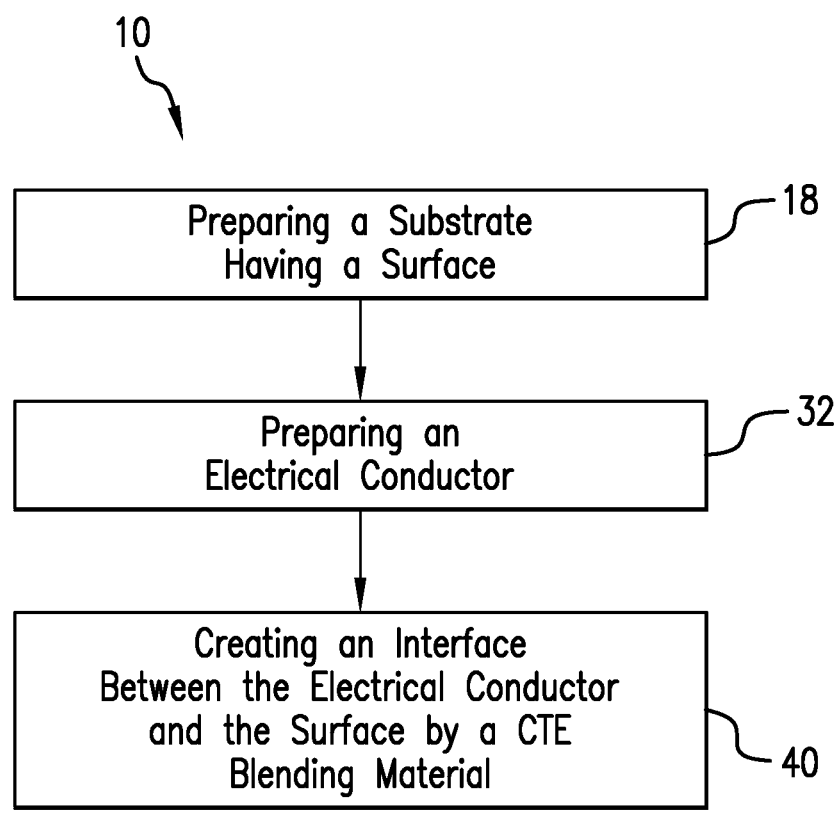
FIG. 1 depicts a block diagram illustrating a method of forming a high temperature sensor, in accordance with a non-limiting example.
Figure 2:
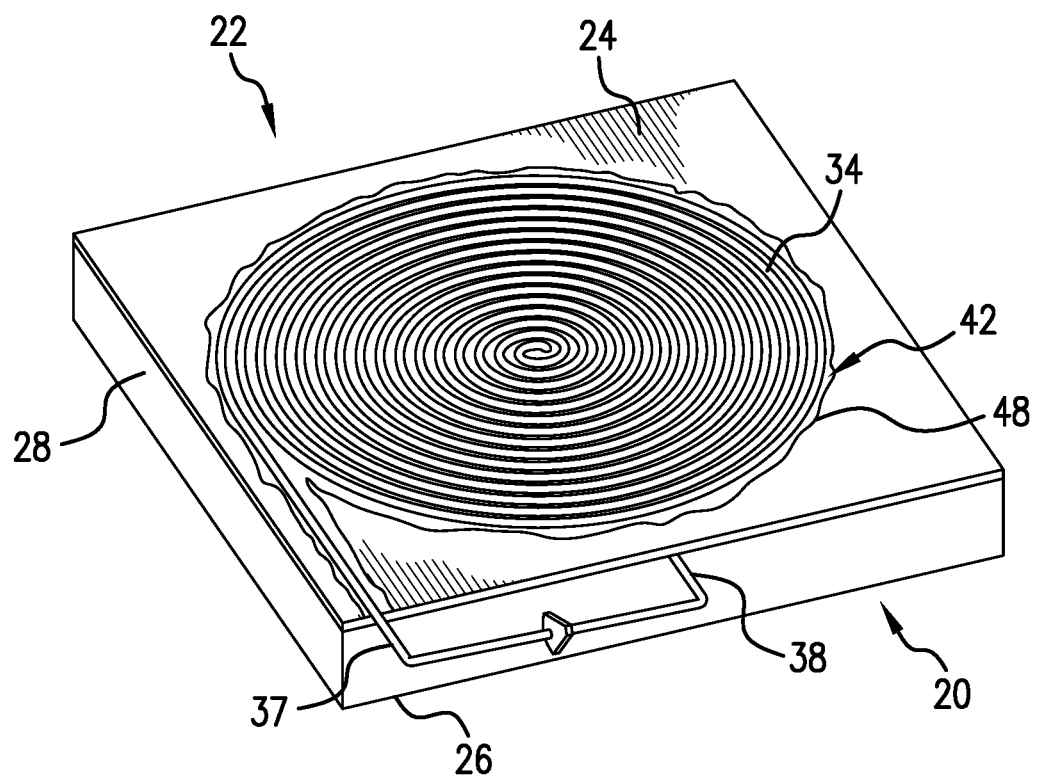
FIG. 2 depicts a high temperature sensor formed by the method illustrated in FIG. 1, in accordance with a non-limiting example.

Referring to FIG. 1, a method of forming a high temperature sensor is indicated generally at 10. In block 18, a high temperature sensor 20 including a substrate 22, such as shown in FIG. 2, is formed. Substrate 22 includes a first substantially planar surface 24 and an opposing second substantially planar surface 26 separated by a plurality of side surfaces, one of which is indicated at 28. Substrate 22, in a non-limiting example, is formed of a dielectric ceramic material having a first coefficient of thermal expansion (CTE). Substrate 22 may be formed by a number of processes. For example, substrate 22 may be formed by an aerosol jetting and/or a material jetting process as part of an electrical conductor additive manufacturing process.

As shown in block 32, an electrical conductor 34 is prepared. As will be detailed herein, electrical conductor 34 may be secured to, for example, first planar surface 24. Electrical conductor 34 may be formed of a metal material or other electrically conductive material having a second CTE that differs from the first CTE. In one non-limiting example, electrical conductor 34 may be formed from an oxidation and corrosion resistant alloy such as a nickel-chromium based alloy or a tungsten based alloy. The particular material chosen for electrical conductor 34 may vary but should be suitable for high temperature applications. That is, high temperature sensor 20 is designed for use in downhole or wellbore applications where temperatures can reach 700° C. or greater. Electrical conductor 34 may be formed using a variety of processes.

In a non-limiting example, electrical conductor 34 may be formed using well known metal extrusion processes or, in another non-limiting example, conductor may be formed directly on substrate 22 or on a preparation substrate (not shown). For example, electrical conductor 34 may be built layer by layer and formed using an aerosol jetting process, a material jetting process, and/or a wire direct energy deposition (DED) process. If formed separately from substrate 22, electrical conductor 34 may be positioned on and bonded to first planar surface 24 as a wire coil as shown in FIG. 2, or in other configurations and may include first and second connector leads 37 and 38.

In block 40, an interface, including a CTE blending medium 42 may be disposed between electrical conductor 34 and substrate 22. CTE blending medium 42 accommodates differing rates of expansion of substrate 22 and electrical conductor 34 due to differing CTE's so as to prevent delamination, fracturing, or other condition that may impact the operational ability of the sensor. CTE blending medium 42 may, in one non-limiting example, may take the form of a nickel-cobalt ferrous alloy. In another non-limiting example, CTE blending medium 42 may take the form of a mixture or blend of materials used to form substrate 22 and electrical conductor 34.

In a non-limiting example, CTE blending medium 42 may be disposed as a layer 48 provided on first planar surface 24. CTE blending medium may be applied by, for example, aerosol jetting, material jetting, and/or a cold spray process. Substrate 22 and CTE blending medium may be formed from pastes that are applied one to the other. For example, Substrate 22 may be formed on a base that includes CTE blending medium 42. In another example, CTE blending medium 42 may be applied directly to first planar surface 24. Whether formed separately and joined or formed together as a single component, substrate 22 and CTE blending medium 42 may be cured in a furnace to remove any binder materials.

Figure 3:
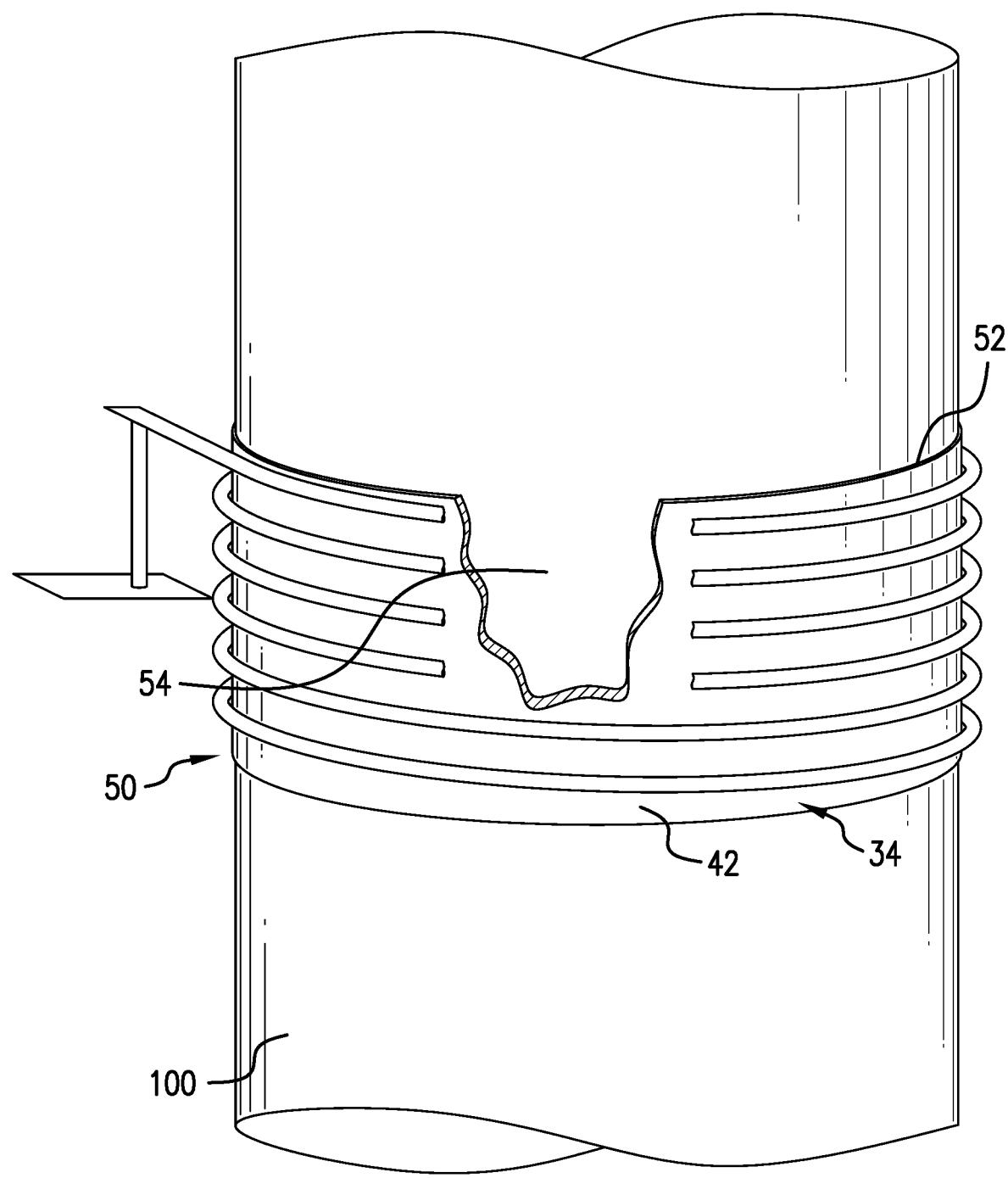
FIG. 3 depicts a downhole tool including a high temperature sensor formed by the method illustrated in FIG. 1, in accordance with another non-limiting example.

Electrical conductor 34 may be formed on and fused to CTE blending medium 42 or formed separately and attached to CTE blending medium 42 to form high temperature sensor 20. In either process, CTE blending medium 42 forms a CTE flexible interface to accommodate differing rates of thermal expansion of substrate 22 and electrical conductor 34. At this point, it should be understood that while substrate 22 is shown as having all substantially planar surfaces, other geometric forms are also possible. FIG. 3 depicts a substrate 50 shown in the form of a cylinder 52 having an outer annular surface 54.

Substrate 50 may be formed in a manner similar to that described herein with respect to substrate 22. In a non-limiting example, electrical conductor 34 may be provided on outer annular surface 54 with a CTE blending medium 42 as an interface material. Electrical conductor 34 may be formed directly on outer annular surface 54 or may be formed separately and wound onto substrate 50 using known methods. In a non-limiting example, substrate 50 is mounted to a downhole tool 100 that may be positioned in a wellbore at a depth in which temperatures may be at or exceed 700° C. In another non-limiting example, outer annular surface 54 may form part of downhole tool 100.

Set forth below are some embodiments of the foregoing disclosure:

Embodiment 1. A method of forming a high temperature sensor comprising: preparing a substrate having a surface from an electrically insulative material having a first coefficient of thermal expansion (CTE); preparing an electrical conductor from a metal material having a second CTE that is different from the first CTE; and creating an interface between the electrical conductor and the substrate with a CTE blending medium that is provided between the substrate and the electrical conductor, the CTE blending medium accommodating differing thermal expansion rates of the substrate and the electrical conductor at temperatures of at least 700° C.

Embodiment 2. The method according to any prior embodiment, wherein creating the interface includes forming a layer of a nickel-cobalt ferrous alloy on the one of the substrate and the electrical conductor.

Embodiment 3. The method according to any prior embodiment, wherein creating the interface includes forming a material that is a blend of the electrically insulative material and the metal material.

Embodiment 4. The method according to any prior embodiment, wherein creating the interface includes depositing the CTE blending medium onto the surface.

Embodiment 5. The method according to any prior embodiment, wherein preparing the electrical conductor includes depositing layers of the electrical conductor on the CTE blending material.

Embodiment 6. The method according to any prior embodiment, wherein depositing the layers includes forming the electrical conductor through an additive manufacturing process.

Embodiment 7. The method according to any prior embodiment, wherein preparing the electrical conductor includes building the electrical conductor from one of an oxidation and corrosion resistant nickel-chromium alloy and Tungsten.

Embodiment 8. The method according to any prior embodiment, wherein preparing the substrate includes creating the substrate layer by layer with an additive manufacturing process.

Embodiment 9. The method according to any prior embodiment, wherein preparing the substrate includes depositing layer upon layer of a dialectic ceramic material to form a substantially planar surface.

Embodiment 10. The method according to any prior embodiment, wherein preparing the electrical conductor includes depositing the electrical conductor onto the substantially planar surface.

Embodiment 11. The method according to any prior embodiment, wherein depositing the electrical conductor onto the substantially planar surface includes forming a wire coil.

Embodiment 12. The method according to any prior embodiment, wherein preparing the substrate includes depositing layer upon layer of a dielectric ceramic material forming a cylinder having an outer annular surface.

Embodiment 13. The method according to any prior embodiment, wherein preparing the electrical conductor includes forming an electrically conductive wire.

Embodiment 14. The method according to any prior embodiment, further comprising: winding the electrically conductive wire about the outer annular surface.

Embodiment 15. The method according to any prior embodiment, wherein preparing the electrically conductive wire includes forming a conductor through one of a direct energy deposition (DED) process and an aerosol jetting process.

Embodiment 16. The method according to any prior embodiment, wherein creating the interface between the electrical conductor to the substrate with the CTE blending medium includes fusing the electrical conductor to the substrate with the CTE blending medium.

Embodiment 17. The method according to any prior embodiment, wherein creating the interface includes depositing the CTE blending medium onto a surface.

Embodiment 18. The method according to any prior embodiment, wherein creating the interface further includes depositing the layer upon layer of a dielectric ceramic material onto the CTE blending medium to form the substrate.

Embodiment 19. The method according to any prior embodiment, wherein creating the interface still further includes fusing the electrical conductor to the CTE blending material.

Embodiment 20. A high temperature sensor formed by the method according to any prior embodiment.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of forming a high temperature downhole sensor comprising:
    preparing a substrate having an outer surface formed from an electrically insulative material having a first coefficient of thermal expansion (CTE);
    preparing an electrical conductor from a metal material having a second CTE that is different from the first CTE; and
    creating an interface between the electrical conductor and the outer surface of the substrate with a CTE blending medium that is provided between the substrate and the electrical conductor, the CTE blending medium forming a CTE flexible interface accommodating differing thermal expansion rates of the substrate and the electrical conductor at downhole temperatures of at least 700° C.

2. The method of claim 1, wherein creating the interface includes forming a layer of a nickel-cobalt ferrous alloy on the one of the substrate and the electrical conductor.

3. The method of claim 1, wherein creating the interface includes forming a material that is a blend of the electrically insulative material and the metal material.

4. The method of claim 1, wherein creating the interface includes depositing the CTE blending medium onto the surface.

5. The method of claim 4, wherein preparing the electrical conductor includes depositing layers of the electrical conductor on the CTE blending material.

6. The method of claim 5, wherein depositing the layers includes forming the electrical conductor through an additive manufacturing process.

7. The method of claim 6, wherein preparing the electrical conductor includes building the electrical conductor from one of an oxidation and corrosion resistant nickel-chromium alloy and Tungsten.

8. The method of claim 1, wherein preparing the substrate includes creating the substrate layer by layer with an additive manufacturing process.

9. The method of claim 8, wherein preparing the substrate includes depositing layer upon layer of a dielectric ceramic material to form a substantially planar surface.

10. The method of claim 9, wherein preparing the electrical conductor includes depositing the electrical conductor onto the substantially planar surface.

11. The method of claim 9, wherein depositing the electrical conductor onto the substantially planar surface includes forming a wire coil.

12. The method of claim 8, wherein preparing the substrate includes depositing layer upon layer of a dielectric ceramic material forming a cylinder having an outer annular surface.

13. The method of claim 12, wherein preparing the electrical conductor includes forming an electrically conductive wire.

14. The method of claim 13, further comprising: winding the electrically conductive wire about the outer annular surface.

15. The method of claim 13, wherein preparing the electrically conductive wire includes forming a conductor through one of a direct energy deposition (DED) process and an aerosol jetting process.

16. The method of claim 1, wherein creating the interface between the electrical conductor to the substrate with the CTE blending medium includes fusing the electrical conductor to the substrate with the CTE blending medium.

17. The method of claim 1, wherein creating the interface includes depositing the CTE blending medium onto the outer surface of the substrate.

18. The method of claim 17, wherein creating the interface further includes depositing the layer upon layer of a dielectric ceramic material onto the CTE blending medium to form the substrate.

19. The method of claim 18, wherein creating the interface still further includes fusing the electrical conductor to the CTE blending material.

20. A high temperature sensor formed by the method of claim 1.

21. A high temperature sensor formed by the method of claim 1 installed on a downhole tool positionable in a wellbore at a depth having a temperature of at least 700° C.

* * * * *